United States Patent

Levy

[11] 4,054,929
[45] Oct. 18, 1977

[54] TAPE RECORDING METHODS AND APPARATUS

[75] Inventor: Avner Levy, Irvine, Calif.

[73] Assignee: Bell & Howell Company, Chicago, Ill.

[21] Appl. No.: 650,213

[22] Filed: Jan. 19, 1976

[51] Int. Cl.$^2$ ............................................. G11B 15/60
[52] U.S. Cl. ...................................... 360/90; 360/130
[58] Field of Search .................... 360/90, 130, 71, 73; 226/190-191, 97, 196; 242/76, 157

[56] References Cited

U.S. PATENT DOCUMENTS

| | | | |
|---|---|---|---|
| 2,646,989 | 7/1953 | Davis | 360/130 |
| 2,747,025 | 5/1956 | Selsted | 360/90 |
| 3,227,343 | 1/1966 | Cheney | 360/90 |
| 3,499,998 | 3/1970 | Tanigawa et al. | 360/130 |
| 3,679,213 | 7/1972 | Roberts et al. | 360/73 |
| 3,688,956 | 9/1972 | Kjos | 360/90 |
| 3,741,564 | 6/1973 | Schulz | 360/90 |

*Primary Examiner*—Alfred H. Eddleman
*Attorney, Agent, or Firm*—Benoit Law Corporation

[57] ABSTRACT

Methods and apparatus for transducing information relative to an information carrier tape employ a cylindrical tape drive capstan rotatable about a line of intersection of two relatively stationary planes extending through the cylindrical capstan at right angles to each other. The tape is placed in a loop about the capstan and a first unsupported tape portion is formed at one side of one of the planes and at one side of the other of the planes, while a second unsupported tape portion is formed at the other side of that one plane and at the one side of that other plane. The tape is further formed into a first leg adjacent the loop at the other side of the other plane and into a second leg adjacent the loop at the other side of the other plane. The capstan is rotated to advance the tape and information is transduced relative to the advancing tape between the above mentioned curvature and the first peripheral region at the first unsupported tape portion and between that curvature and the second peripheral region at the second unsupported tape portion.

26 Claims, 5 Drawing Figures

TAPE RECORDING METHODS AND APPARATUS

BACKGROUND OF THE INVENTION

1. Field of the Invention

The subject invention relates to magnetic and other tape recording and reproducing methods and apparatus and, more specifically, to magnetic and other information carrier tape transport methods and equipment.

2. Description of the Prior Art

Broadly speaking, the magnetic tape transport art may be devided into the three categories concerned with "open loop", "closed loop" and "zero loop" equipment. In open loop equipment, the tape proceeds from a supply reel to a transducing head, thence to a capstan and pinch roller, and further to a takeup reel. This arrangement subjects the magnetic tape to vibrations and tension fluctuations originating at the supply reel. In an effort to overcome this disadvantage, the closed loop system employs the tape drive capstan and a tape turnabout roller or tape guide to provide a tape loop which is mechanically isolated from the tape supply for an improved recording and playback of information relative to the tape. Despite these improvements, the closed loop design is still subject to performance degradation through tape vibration in the loop.

Accordingly, the tape transport art concerned with instrumentation tape recording and other high precision endeavors, has been moving in the direction of zero loop equipment in which the information transducing operation takes place at the tape drive capstan itself. Initially, the information transducing devices were placed directly into contact with the tape on the capstan. A drawback of this extreme zero loop design is that even slight tape eccentricities cause serious head to tape separation and head wear problems. These and other performance degradations practically exclude the extreme zero loop design from most practical applications.

In an effort to avoid the disadvantages of the zero loop design while at the same time retaining as much as possible of its advantages, there have been proposals and designs according to which the tape has been lifted off from the capstan in order to provide for a performance of information transducing operations closely to the capstan but nevertheless out of direct contact therewith. One design of this kind has used a pneumatic capstan or adjacent pneumatic device for forming a bulge in the tape at the capstan and for pressing such bulge against transducing head equipment. In practice, such a design encumbers the transport with pneumatic equipment and considerably reduces the attainable traction the capstan is capable of exerting on the tape. These problems are compounded if more than one read-write head assembly is needed in the operation of the equipment.

Another tape of proposal has employed a curved tape guide with a radius of the same order of magnitude as the radius of the capstan for a separation of the tape from the capstan for the performance of information transducing functions. This design also places severe limitations on the attainable tape drive traction and tends to require the use of floating or movable tape supply and takeup rolls.

In order to enable the type of interlace track operation prevailing in the instrumentation tape recorder field and requiring a spacing of 1½ inches between corresponding heads, it has been proposed to lift the tape off the capstan at two spaced locations with the aid of rollers, posts or airbearings providing each two unsupported tape portions at which the recording and playback operations are effected. Lifting the tape off the capstan periphery at two locations severely reduced the total capstan-to-tape traction area for a given diameter. Accordingly, proposals of the latter type are typically characterized by very large capstan diameters, making for a high-inertia tape drive. In practice, even such a sacrifice was insufficient and complex vacuum-action capstans and associated vacuum equipment had to be employed to provide workable tape transports in high-quality type of environments.

A reduction is requisite capstan diameter eventually resulted when two of four recording heads were placed at the tape input of the capstan, while the remaining two heads were located at the tape turnabout side, where a circular cylindrical roller effected the tape turnabout. In practice, use of a circular cylindrical turnabout roller, however, necessarily spaced the tape away from the capstan by a distance larger than the diameter of the turnabout roller, which significantly reduced the useful capstan-to-tape traction area, necessitating again an increase in the capstan diameter to provide enough tape-to-capstan contact periphery. Moreover, the practical manifestation of the latter proposal was incapable of preserving the tape loop when the heads were removed from their operating positions. In consequence, and in order to have sufficient effective traction surface in all operational modes of the tape transport, it was necessary with that proposal to keep the heads in engagement with the tape during fast forward and rapid rewind of the tape. This more rapidly degraded the tape as well as the head surfaces through excessive wear.

Accordingly, there have been proposals to revert to the absolute zero loop design in which the recording and playback heads bear directly against the tape on the capstan. In order to alleviate the damaging influences of capstan eccentricities and similar factors, a very thick elastomer sleeve has been placed on the capstan proper. This, is turn, has made the capstan subject to hygroscopic diameter variations and warping. Nevertheless, thick elastomer coatings on zero loop type capstans had been continued to be employed, even in designs wherein the tape is lifted off the capstan for the above mentioned purposes.

SUMMARY OF THE INVENTION

It is broadly an object of this invention to overcome the above mentioned disadvantages.

It is a related object of this invention to provide improved zero loop type tape transport methods and equipment.

It is also an object of this invention to maximize the effective tape traction surface for a given diameter of capstans in zero loop type tape transports with lifted-off tape portions.

It is, moreover, an object of this invention to maximize the isolation of the transducing heads and of unsupported tape portions at the transducing heads from the tape supply and takeup mechanism, even with respect to transducing heads that are situated at the tape input side of the capstan.

Other objects will become apparent in the further course of this disclosure.

From a first aspect thereof, the subject invention resides in a method of transducing information relative to an information carrier type and, more specifically, in the improvement of driving said tape with, and transducing information relative to said tape at, a cylindrical tape drive capstan rotatable about a line of intersection of two relatively stationary planes extending through said cylindrical capstan at right angles to each other, comprising in combination the steps of placing said tape in a loop about said capstan, forming at one side of one of said planes and at one side of the other of said planes a first unsupported tape portion in said loop and at the other side of said one plane and said one side of said other plane a second unsupported tape portion in said loop by spacing said tape from said capstan along a curvature having a radius smaller than the radius of said capstan and having on said one plane an apex spaced from said capstan by a distance shorter than said smaller radius, forming said tape into a first leg adjacent said loop at the other side of said other plane and bringing said first leg into proximity to said one side of said one plane, forming said tape into a second leg adjacent said loop at said other side of said other plane and bringing said second leg into proximity to said other side of said one plane, and bringing said first and second legs into proximity to each other at a distance between said first and second legs smaller than the distance between said first and second unsupported portions, maintaining said tape in driving engagement with said capstan throughout a first peripheral region extending from said first unsupported portion to a portion of said loop adjacent said first leg, maintaining said tape in driving engagement with said capstan throughout a second peripheral region extending from said second unsupported portion to a portion of said loop adjacent said second leg, rotating said capstan to advance said tape, transducing information relative to said advancing tape between said curvature and said first peripheral region at said first unsupported tape portion, and transducing information relative to said advancing tape between said curvature and said second peripheral region at said second unsupported tape portion.

From another aspect thereof, the subject invention resides in apparatus for transducing information relative to an information carrier tape and, more specifically, in the improvement comprising, in combination, a base, a cylindrical tape drive capstan mounted on said base for rotation about a line of intersection of two relatively stationary planes extending through said cylindrical capstan at right angles to each other, means for placing said tape in a loop about said capstan, including means for forming at one side of one said planes and at one side of the other of said planes a first unsupported tape portion in said loop and at the other side of said one plane and said one side of said other plane a second unsupported tape portion in said loop, said forming means including means for spacing said tape from said capstan along a curvature having a radius smaller than the radius of said capstan and having on said one plane and apex spaced from said capstan by a distance shorter than said smaller radius, means for forming said tape into a first leg adjacent said loop at the other side of said other plane and bringing said first leg into proximity to said one side of said one plane, for forming said tape into a second leg adjacent said loop at said other side of said other plane and bringing said second leg into proximity to said other side of said one plane, and for bringing said first and second legs into proximity to each other at a distance between said first and second legs smaller than the distance between said first and second unsupported portions, whereby said tape is maintained in driving engagement with said capstan throughout a first peripheral region extending from said first unsupported portion to a portion of said loop adjacent said first leg and in driving engagement with said capstan throughout a second peripheral region extending from said second unsupported portion to a portion of said loop adjacent said second leg, means connected to said capstan for rotating said capstan to advance said tape, and means for transducing information relative to said advancing tape between said curvature and said first peripheral region at said first unsupported tape portion and for transducing information relative to said advancing tape between said curvature and said second peripheral region at said second unsupported tape portion.

From yet another aspect thereof, the subject invention resides in apparatus for transducing information relative to an information carrier tape, and, more specifically, in the improvement comprising in combination, a base, a cylindrical tape drive capstan mounted on said base for rotation about a line of intersection of two relatively stationary planes extending through said cylindrical capstan at right angles to each other, means for placing said tape in a loop about said capstan, including means for forming at one side of one of said planes and at one side of the other of said planes a first unsupported tape portion in said loop and for forming said tape into a first leg adjacent said first unsupported tape portion and bringing said first leg into proximity to said one side of said one plane, and means for forming at the other side of said one plane and said one side of said other plane a second unsupported tape portion in said loop, and for forming said tape into a second leg adjacent said second unsupported tape portion and bringing said second leg into proximity to said other side of said one plane, said means for forming said first unsupported tape portion and said first leg including a first tape guiding device, said means for forming said second unsupported tape portion and said second leg including a second tape guiding device, said first tape guiding device having a tape guiding surface having a curvature and a thickness behind said tape guiding surface of less than a radius of said curvature of said tape guiding surface of said first tape guiding device, said second tape guiding device having a tape guiding surface having a curvature and a thickness behind said curvature of said tape guiding surface of said second tape guiding device or less than a radius of said curvature of said tape guiding surface of said second tape guiding device, a first information transducing device, a second information transducing device, means connected to said first transducing device for releasably mounting said first transducing device in tranducing relationship with said tape at said first unsupported tape portion and partially behind said first tape guiding device as seen from said tape guiding surface of said first tape guiding device, means connected to said second transducing device for releasably mounting said second transducing device in transducing relationship with said tape at said second unsupported tape portion and partially behind said second tape guiding device as seen from said tape guiding surface of said second tape guiding device, and means connected to said capstan for rotating said capstan to advance said tape.

From still another aspect thereof, the subject invention resides in apparatus for transducing information relative to an information carrier tape and, more specifically, in the improvement comprising in combination, a base, a cylindrical tape drive capstan mounted on said base for rotation about a line of intersection of two relatively stationary planes extending through said cylindrical capstan at right angles to each other, means for placing said tape in a loop about said capstan, including means for forming at one side of one of said planes and at one side of the other of said planes a first unsupported tape portion in said loop and for forming said tape into a first leg adjacent said first unsupported tape portion and bringing said first leg into proximity to said one side of said one plane, means for forming at the other side of said one plane and said one side of said other plane a second unsupported tape portion in said loop, and for forming said tape into a second leg adjacent said second unsupported tape portion and bringing said second leg into proximity to said other side of said one plane, and means for forming at one side of said one plane and at the other side of said other plane a third unsupported tape portion in said loop and at the other side of said one plane and at the other side of the other of said planes a fourth unsupported tape portion in said loop, said means for forming said first unsupported tape portion and said first leg including a first tape guiding device, said means for forming said second unsupported tape portion and said second leg including a second tape guiding device, said first tape guiding device having a tape guiding surface having a curvature and a thickness behind said tape guiding surface of less than a radius of said curvature of said tape guiding surface of said first tape guiding device, said second tape guiding device having a tape guiding surface having a curvature and a thickness behind said curvature of said tape guiding surface of said second tape guiding device of less than a radius of said curvature of said tape guiding surface of said second tape guiding device, said means for forming said third and fourth unsupported tape portions including means for spacing said tape from said capstan along a curvature having a radius smaller than the radius of said capstan and having an apex on said one plane, a first information transducing device, a second information transducing device, means connected to said first transducing device for releasable mounting said first transducing device in transducing relationship with said tape at said first unsupported tape portion and partially behind said first tape guiding device as seen from said tape guiding surface of said first tape guiding device, means connected to said second transducing device for releasably mounting said second transducing device in transducing relationship with said tape at said second unsupported tape portion and partially behind said second tape guiding device as seen from said tape guiding surface of said second tape guiding device, a third information transducing device and means for mounting said third information transducing device in transducing relationship with said tape at said third unsupported tape portion, a fourth information transducing device and means for mounting said fourth information transducing device in transducing relationship with said tape at said fourth unsupported tape portion, and means connected to said capstan for rotating said capstan to advance said tape.

BRIEF DESCRIPTION OF THE DRAWINGS

The subject invention and its objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
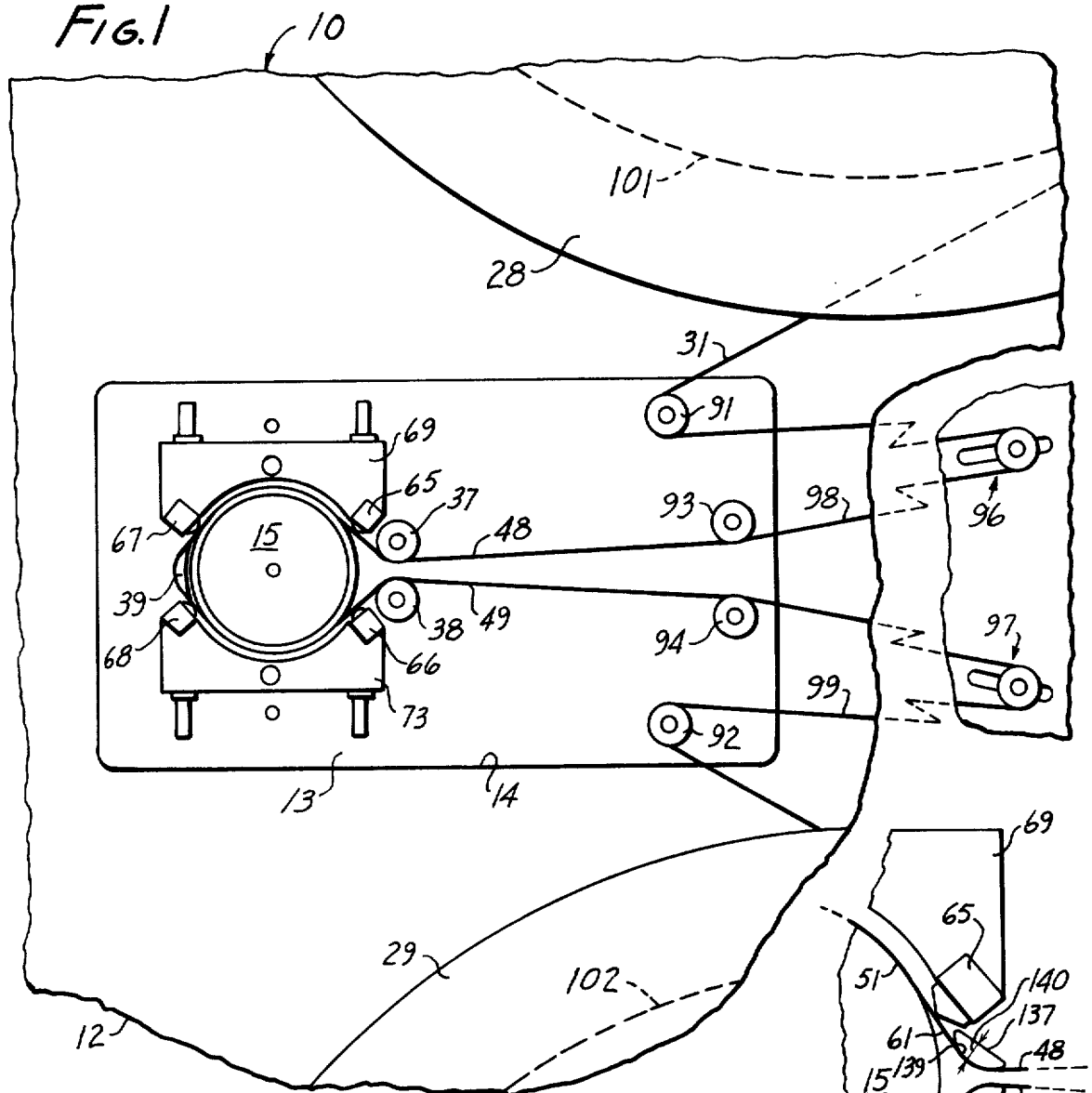
FIG. 1 is a plan view of a tape transport in accordance with a preferred embodiment of the subject invention.
Figure 2:
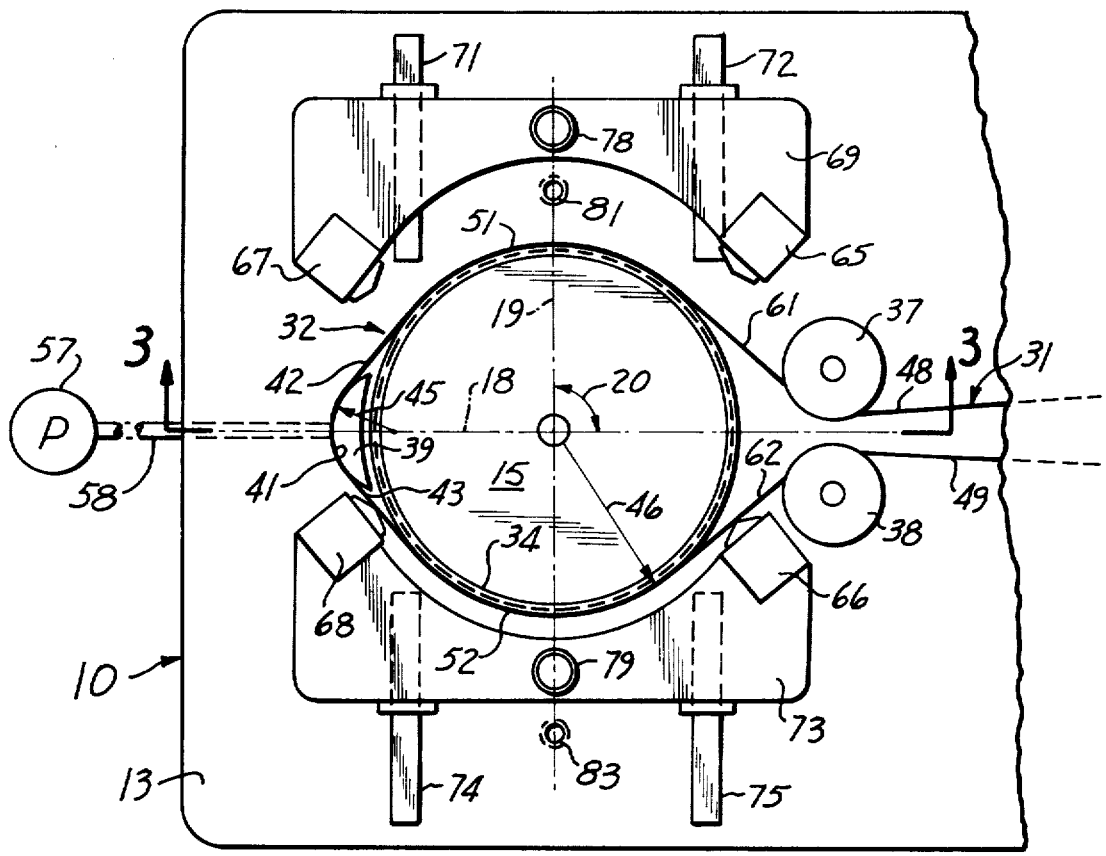
FIG. 2 is a plan view, on an enlarged scale, of a detail of the tape transport shown in FIG. 1.
Figure 3:
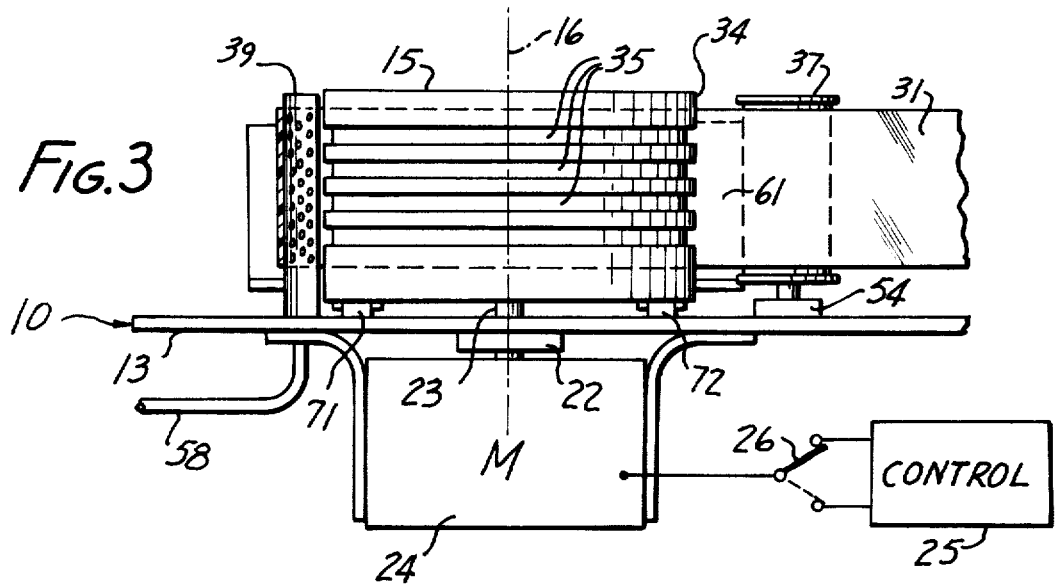
FIG. 3 is a section taken along the line 3—3 in FIG. 2.

The tape transport in accordance with a preferred embodiment of the subject invention shown in FIGS. 1 to 3 has a base 12 with a base plate insert 13. The insert 13 may be connected to the base 12 or mounted in any other desired manner in a corresponding aperture 14 of the base. A cylindrical tape drive capstan 15 is mounted on the base for rotation about a line of intersection 16, shown in FIG. 3, of two planes 18 and 19 which are stationary relative to the base and which extend through the cylindrical capstan 15 at right angles to each other as shown at 20 in FIG. 2. To this end, a bearing 22 on the base plate insert 13 rotatably mounts a capstan shaft 23. The shaft 23 is connected to and driven by a capstan drive motor 24 which may be of a conventional type and which may be controlled by a conventional capstan servocontrol shown only symbolically at 25 in FIG. 3.

Also symbolically shown in FIG. 23 by means of a switch 26 is a feature, which may be of a conventional type, for advancing the recording tape at a recording and reproduce speed in the solidly illustrated position of the switch 26, and selectively at a fast forward speed in the second positive of the switch 26 indicated by a dotted line in FIG. 3. In practical applications, the tape transport typically has a rapid rewind speed feature, as well as several switchable recording and playback speeds.

For instance, known instrumentation tape transport equipment has speeds ranging from less than 1 inch per second to 120 inches per second. Such multi-speed equipment may be employed in the practice of the subject invention, but is not illustrated in the drawings because of its conventional nature.

Fractions of two tape reels 28 and 29 are visible in FIG. 1 as part of a means, including conventional reel drives (not shown), for providing alternatively a facility for supplying or taking up magnetic recording tape 31.

The tape 31 is placed in a loop 32 about the capstan 15. In accordance with conventional practice, the capstan may have an elastomer coating or sleeve 34 to increase the effective coefficient of friction and several grooves 35 to reduce the inclusion of friction reducing air pockets between tape and capstan. In accordance with a preferred embodiment, the elastomer or high-friction sleeve 34 forms a relatively thin coating on an otherwise metallic capstan for increased stiffness and immunity to hygroscopic distortions and warping.

At the tape input side of the capstan, there is a first tape guiding device 37 and a second tape guiding device 38 located at opposite sides of the plane 18 and at the same side of the other plane 19.

Substantially diametrically opposite to the tape guiding devices 37 and 38 there is located a third tape guiding device 39 having a curvature 41 for forming at one side of the plane 18 and at one side of the plane 19 a first unsupported tape portion 42 in the tape loop 32, and for forming at the other side of the plane 18 and at the one side of the plane 19 a second unsupported tape portion 43 in the tape loop 32.

In accordance with the subject invention, the curvature 41 of the third tape guiding device 39 has a radius 45 which is smaller than the residus 46 of the capstan. In addition, the curvature 41 has on the plane 18 an apex space from the capstan 15 by a distance shorter than the smaller radius 45.

Moreover, the first tape guiding device 37 is effective to form the tape 31 into a first leg 48 adjacent the tape loop 32 at the other side of the plane 12 and to bring that first leg 48 into proximity to one side of the plane 18. Similarly, the second tape guiding device 38 is effective to form the tape 31 into a second leg 49 adjacent the tape loop 32 at the other side of the plane 18 and to bring that second leg 14 into proximity to the other side of the plane 18.

The first and second tape guiding devices 37 and 38 are jointly effective to bring the first and second legs 48 and 49 into such proximity to each other that the distance between these first and second legs at the tape guiding devices 37 and 38 is smaller than the distance between the first and second unsupported tape portions at the third tape guiding device 39.

In this manner, the tape is maintained in driving engagement with the capstan 15 at maximum wrap angles throughout a first peripheral region 51 extending from the first unsupported tape portion 42 to a portion of the loop 32 adjacent the first leg 48, and throughout a second peripheral region 52 extending from the second unsupported tape portion 43 to a portion of the loop 32 adjacent the second leg 49.

In accordance with an illustrated preferred embodiment, the base plate insert 13 rigidly mounts the first, second and third tape guiding devices 37, 38 and 39 relative to the line of intersection or axis of rotation 16. The first and second tape guiding devices 37 and 38 may be tape guiding posts or air-bearing tape guides rigidly attached to the base plate insert 13. Alternatively, and as shown in FIGS. 2 and 3, the first and second tape guiding devices 37 and 38 may be cylindrical tape guide rollers which are rotatably mounted by bearings 54 on the base plate insert 13. This is still a rigid mounting relative to the line of intersection 16, since the tape guiding devices 37 and 38, while rotatable in the illustrated preferred embodiment, are rotatable about axes which are maintained rigid relative to, or undeviating from, the line of intersection 16 by bearings 22 and 54 and the base plate insert 13.

The tape lift-off or third tape guiding device 39 is preferably an air bearing as shown in FIG. 3, for minimum friction of the tape relative thereto. A pressurized air supply 57 furnishes the requisite operating fluid to the third tape guiding device via a line 58. In the illustrated preferred embodiment, the third tape guiding device is rigidly mounted relative to the line of intersection 16 by being fixedly attached to the base plate insert 13.

In the illustrated preferred embodiment shown in FIGS. 1 to 3, each of the first and second tape guiding devices 37 and 38 is rigidly mounted at a distance from the capstan 15 to provide in the tape loop 32 a third unsupported tape portion 61 between the first peripheral region 51 and the first leg 48, and a fourth unsupported tape portion 62 between the second peripheral region 52 and the second leg 49, respectively.

In both preferred embodiments shown in the drawings, information is transduced relative to the advancing tape 31 between the curvature 41 and the first peripheral region 51 at the first unsupported tape portion 42, and information is transduced relative to the advancing tape between the curvature 41 and the second peripheral region 52 at the second unsupported tape portion 43 when the motor 24 rotates the capstan 15 about the line or axis 16 at a tape advance speed.

In addition, in the presently preferred embodiment shown in FIGS. 1 to 3, information is also transduced relative to the advancing tape at the third and fourth unsupported tape portions 61 and 62.

The means for performing these information transducing operations include a first information transducing device or head 65, a second information transducing device 66, a third information transducing device 67, and a fourth information transducing device 68. By way of example, the transducing devices 65 and 67 may be interlace track magnetic recording heads with the head 65 recording in odd-numbered and the head 67 in even-numbered tracks. Similarly, the transducing devices 66 and 68 may be magnetic reproduce heads of the interlace track type, with the head 66 reproducing recorded information from even-numbered and the head 68 reproducing information from odd-numbered tracks. In accordance with applicable convention, the effective spacing between the heads 65 and 67 is 1¼ inches. The same applies to the heads 66 and 68.

The heads 65 and 67 are mounted on a carriage 69 which is movable along rails 71 and 72 on the base plate insert 13. Similarly, the heads 56 and 58 are attached to a carriage 73 which is movable along rails 74 and 75 on the base plate insert 13. If desired, two position points, ridges or stops may be used instead of two rails to fix the position of the heads 65 and 67 or 66 and 68 relative to the unsupported tape portions when the heads are in their active positions in transducing relationship with the tape.

In this manner, the first transducing device 65 is releasably mountable in a first position in transducing the relationship with the tape 31 at the third unsupported tape portion 61 and is selectively withdrawable to a second position out of transducing relationship with the tape, as shown in solid outline in FIG. 2. Similarly, the second transducing device 66 is releasably mounted in a third position in transducing relationship with the tape at the fourth unsupported tape portion 62, as shown in solid outline in FIG. 2, and is selectively withdrawable to a fourth position out of transducing relationship with the tape.

The third transducing device 67, on the other hand, is releasably mounted in a fifth position in transducing relationship with the tape at the first unsupported tape portion 42 and is selectively withdrawable to a sixth position out of transducing relationship with the tape, as shown in solid outline in FIG. 2. Similarly, the fourth transducing device 68 is releasably mounted in a seventh position, shown in solid outline in FIG. 2, in transducing relationship with the tape at the second unsupported tape portion 43 and is selectively withdrawable to an eighth position out of transducing relationship with the tape.

By way of example, the carriage 69 is provided with a set screw 78, and the carriage 73 is provided with a set screw 79. The set screw 78 is threaded in a tapped hole 81 in the base plate insert 13 to retain the transducing devices 65 and 67 in transducing engagement with the unsupported tape portions 42 and 61. The set screw 79 similarly retains the heads 66 and 68 in transducing engagement with the unsupported tape portions 62 and 43. The swhich 26 shown in FIG. 3 is then in its solidly illustrated position to cause the motor 24 to rotate the capstan 15 at a first rate to advance the tape 31 at a first or recording/playback speed when the tranducing devices are in their above mentioned active positions in engagement with unsupported tape portions.

The set screws 78 and 79 may be loosened and the carriages 69 and 73 removed to their withdrawn positions.

The base plate insert 13 is provided with two further tapped holes, one of which is visible at 83 and the other of which is hidden by the withdrawn carriage 69. These further tapped holes, in cooperation with the set screws 78 and 79, serve the releasable retention of the carriages 69 and 73 in their withdrawn positions.

The set screws 78 and 79 and the tapped holes 81, 83 etc. are only shown by way of example. If desired, the carriages 66 and 69 may be actuated in a conventional manner by solenoids or other electromechanical actuators.

In either case, the motor 24 rotates the capstan 15 at as second rate which is higher than the above mentioned first rate to advance the tape 31 at a second speed higher than the above mentioned first speed when the transducing devices are withdrawn from the tape as mentioned above. This second mode of operation is symbolized in FIG. 3 by the dotted line at the switch 26.

As an important feature, the above mentioned rigid mounting of the tape guiding devices 37, 38 and 39 maintains the first and second legs 48 and 49 spaced at the above mentioned smaller distance and the tape loop 32 essentially intact while the transducing devices are withdrawn from the tape. This is an important feature which distinguishes the illustrated preferred embodiments from certain prior-art tape transports in which the tape loop was opened or otherwise significantly varied when the transducing heads were withdrawn. By keeping the tape loop intact in the manner just described, the requisite tape traction surface between capstan and tape loop for fast forward and rapid rewind operations is preserved without any engagement of the heads with the tape being necessary for that purpose. This prevents the rapid head and tape wear that would occur if the heads were in contact with the tape during the fast forward and rapid rewind modes.

Also, the recording heads 65 and 67 may be withdrawn as shown in FIG. 2 during reporduction with the reproduce heads 66 and 68 only. This saves the expensive recording heads from premature wear while maintaining the tape loop configuration essentially intact for ample tape traction during playback operations.

According to the illustrated preferred embodiment shown in FIG. 1, the tape transport includes a fourth tape guiding device 91 and a fifth tape guiding device 92. These fourth and fifth tape guiding devices 91 and 92, as well as further tape guiding devices 93 and 94, may be of the same type as the first and second tape guiding devices 37 and 38. As with these first and second tape guiding devices 37 and 38, the base plate insert 13 rigidly mounts the tape guiding devices 91 to 94 relative to the line of intersection or axis of rotation 16.

In particular, the base plate insert 13 mounts the fourth tape guiding devices 91 at a distance from the first tape guiding device 37, and the fifth tape guiding device 92 at a distance from the second tape guiding device 38, as shown in FIG. 1. Variable loop formers 96 and 97 are provided as shown in FIG. 1 to form a variable tape loop 98 between the first and fourth tape guiding devices and a variable tape loop 99 between the second and fifth tape guiding devices. These loop formers may be of a conventional type, having, for instance, spring biased pivoted arms (not shown) and devices (not shown) for sensing the postion of these arms to control the tape reel motors and tensions in a conventional manner. Alternatively or additionally, conventional tape vacuum columns mmay be employed as loop formers in tape transports according to preferred embodiments of the subject invention.

The illustrated rigid mounting or "bringing back" of the tape to the rigid base plate insert 13 adjacent eiher tape reel 28 and 29 is an important feature of the illustrated preferred embodiment, since it further isolates the unsupported tape portions 61 and 62 and thus the transducer heads 65 and 66 from disturbances in the tape supply and takeup mechanism. In this manner, the heads 65 and 66 can be employed at the tape input of the capstan with the same efficacy as the heads 67 and 68 at the tape turnabout where the capstan 15 itself isolates the unsupported tape portions 42 and 43 from tape supply and takeup disturbances.

In this manner, it is possible to realize the requisite spacing between corresponding heads with maximum tape wrap around the capstan at a minimum diameter, resulting in a low-inertia capstan. This favorably distinguishes the preferred embodiments of the subject invention from those prior-art transports in which the transducing heads were only brought into engagement with the tape after the tape had contacted the capstan for an isolation of the tape loop from the tape supply and takeup mechanism by the capstan. This type of prior-art isolation was responsible for the embodiments which lifted the tape off the capstan at two spaced locations, thereby necessitating an increase in the capstan diameter and eventuating an increased system inertia.

As seen in FIG. 1, the partially visible tape reel 28 provides a first tape supply 101 adjacent the rigidly mounted fourth tape guiding device 91, while the partially visible tape reel 29 provides an alternative second tape supply 102 adjacent the rigidly mounted fifth tape guiding device 92.

Figure 4:
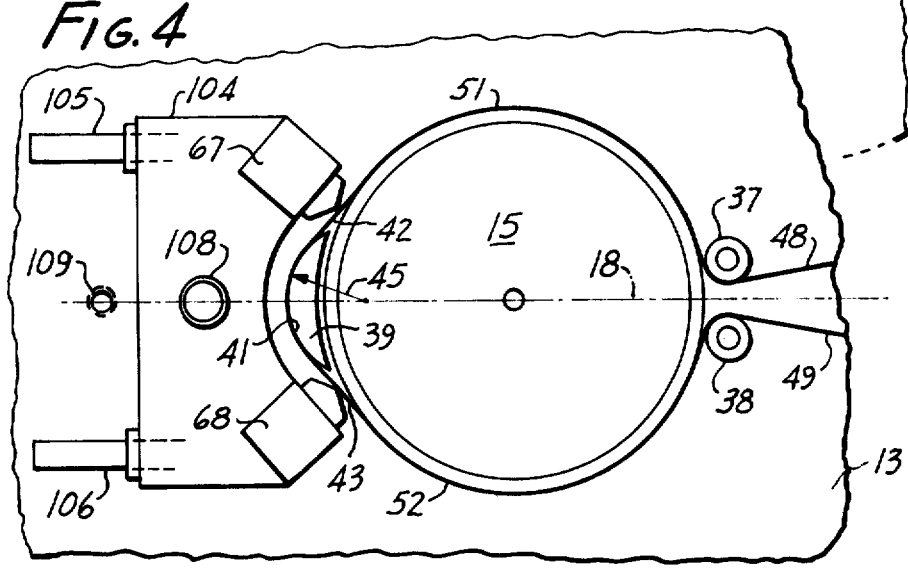
FIG. 4 is a fraction of a plan view, similar to FIG. 2, showing a modification of the tape transport shown in FIGS. 1 to 3, in accordance with a further preferred embodiment of the subject invention.

The detail view of FIG. 4 illustrate a further preferred embodiment which is advantageous for recording and playback devices in computer systems and other environments in which two, rather than four transducing devices are employed.

According to FIG. 4, the heads 67 and 68 which, respectively, may be recording heads and playback heads are located on a common carriage 104 which is slidable along rails 105 and 106 on the base plate insert 13 and which may be releasably retained by a set screw 108, corresponding to the above mentioned set screw 78, in an active position and by the same set screw and a tapped bore 109, corresponding to the above mentioned tapped bore 83, in a withdrawn position. When in the active position, the heads 67 and 68 engage the unsupported tape portions 42 and 43 located between the curved third tape guiding device 39 and, respectively, the first peripheral region 51 and the second peripheral region 52 of the tape-to-capstan engagement, shown in FIG. 4. If desired, the first and second tape guiding devices 37 and 38 may be mounted by the rigid base plate insert 13 closely adjacent the capstan 15 to further maximize the lengths of the regions 51 and 52 for maximum tape traction. The remainder of the tape transport shown in FIG. 4 may be equal or similar to the transport shown in FIGS. 1 to 3.

Figure 5:
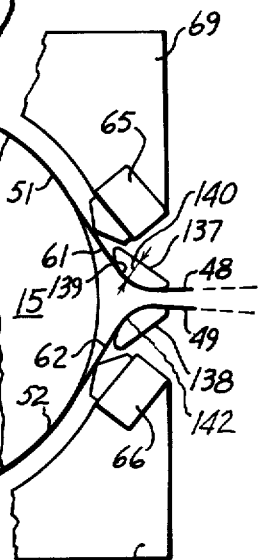
FIG. 5 is a fraction of a plan view, similar to FIG. 2 showing a further modification of the tape transport shown in FIGS. 1 to 3, in accordance with yet another preferred embodiment of the subject invention.

According to the further preferred embodiment shown in FIG. 5 there is a first tape guiding device 137 in lieu of the previously described first tape guiding device 37 and a second tape guiding device 138 in lieu of the previously described second tape guiding device 38. The first tape guiding device 137 has a tape guiding surface 139 having a curvature, and has a thickness 140 behind that guiding surface 139 of less than a radius of the latter curvature of the tape guiding surface 139 of the first tape guiding device 137.

Similarly, the second tape guiding device 138 has a tape guiding surface 142 having a curvature, and has a thickness behind that guiding surface 142 of less than a radius of the latter curvature of the tape guiding surface 142 of the second tape guiding device 138.

The information transducing means again include the heads 65 and 66 for transducing information relative to the advancing tape at the third and fourth unsupported tape portions.

The carriage 69 releasably mounts the transducing heads 65 in transducing relationship with the tape at the third unsupported tape portion 61 and partially behind the first tape guiding device 137 as seen from the tape guiding surface 139 of that first tape guiding device 137.

Similarly, the carriage 73 releasably mounts the transducing head 66 in transducing relationship with the tape at the fourth unsupported tape portion 62 and partially behind the second tape guiding device 138 as seen from the tape guiding surface 142 of that second tape guiding device 138.

In this manner, the requisite lengths of the unsupported tape portions 61 and 62 can be considerably shortened to dimensions similar to those of the unsupported tape portions 42 and 43, thereby further improving the recording and playback quality.

The remainder of the apparatus shown in FIG. 5 may be similar to the equipment shown in FIGS. 1 to 3.

If desired, the third guide 39 maybe omitted in the preferred embodiment of FIG. 5, whereby the tape will be in intimate contact with the capstan along the loop 32 and the peripheral portions of tape-and-capstan contact 51 and 52 will merge. The heads 67 and 68 would then also be omitted, and the heads 65 and 66 could then be a recording and a reproduce head, respectively, in a computer or other read/write system.

The illustrated equipment could be further supplemented by conventional erase heads or other desired apparatus or devices.

The subject extensive disclosure will suggest or render apparent various modifications or variations within the spirit and scope of the subject invention to those skilled in the art.

I claim:

1. In a method of transducing information relative to an information carrier tape, the improvement of driving said tape with, and transducing information relative to said tape at, a cylindrical tape drive capstan rotatable about a line of intersection of two relatively stationary planes extending through said cylindrical capstan at right angles to each other, comprising in combination the steps of:

placing said tape in a loop about said capstan;

forming at one side of one of said planes and at one side of the other of said planes a first unsupported tape portion in said loop and at the other side of said one plane and said one side of said other plane a second unsupported tape portion in said loop by spacing said tape from said capstan along a curvature having a radius smaller than the radius of said capstan and having on said one plane an apex spaced from said capstan by a distance shorter than said smaller radius;

forming said tape into a first leg adjacent said loop at the other side of said other plane and bringing said first leg into proximity to said one side of said one plane, forming said tape into a second leg adjacent said loop at said other side of said other plane and bringing said second leg into proximity to said other side of said one plane, and bringing said first and second legs into proximity to each other at a distance between said first and second legs smaller than the distance between said first and second unsupported portions;

maintaining said tape in driving engagement with said capstan throughout a first peripheral region extending from said first unsupported portion to a portion of said loop adjacent said first leg;

maintaining said tape in driving engagement with said capstan throughout a second peripheral region extending from said second unsupported portion to a portion of said loop adjacent said second leg;

rotating said capstan to advance said tape;

transducing information relative to said advancing tape between said curvature and said first peripheral region at said first unsupported tape portion; and transducing information relative to said advancing tape between said curvature and said second peripheral region at said second unsupported tape portion.

2. A method as claimed in claim 1, including the steps of:

forming in said loop a third unsupported tape portion at said portion of said loop adjacent said first leg; and forming in said loop a fourth unsupported tape portion at said portion of said loop adjacent said second leg.

3. A method as claimed in claim 2, including the steps of:

transducing information relative to said advancing tape at said third unsupported tape portion between said first peripheral region and said first leg; and transducing information relative to said advancing tape at said fourth unsupported tape portion between said second peripheral region and said second leg.

4. A method as claimed in claim 2, including the steps of:

providing first and second infomation transducing devices;

applying said first and second information transducing devices to said third and fourth unsupported tape portions, respectively;

rotating said capstan at a first rate to advance said tape at a first speed;

transducing information with said applied first and second information transducing devices relative to said tape advancing at said first speed;

withdrawing said first and second information transducing devices from said third and fourth unsupported tape portions;

maintaining said first and second legs spaced at said smaller distance and said tape loop intact while said first and second transducing devices are withdrawn from said third and fourth unsupported tape portions; and rotating said capstan at a second rate higher than said first rate to advance said tape at a second speed higher than said first speed when said first and second transducing devices are withdrawn from said third and fourth unsupported tape portions and said tape loop is maintained intact.

5. A method as claimed in claim 2, including the steps of:

providing first, second, third and fourth information transducing devices;

applying said first, second, third and fourth information transducing devices to said first, second, third and fourth unsupported tape portions, respectively;

rotating said capstan at a first rate to advance said tape at a first speed;

transducing information with said applied first, second, third and fourth information transducing devices relative to said tape advancing at said first speed;

withdrawing said first, second, third and fourth information transducing devices from said first, second, third and fourth unsupported tape portions;

maintaining said first and second legs spaced at said smaller distance and said tape loop intact while said first, second, third and fourth transducing devices are withdrawn from said first, second, third and fourth unsupported tape portions; and rotating said capstan at a second rate higher than said first rate to advance said tape at a second speed higher than said first speed when said first, second, third and fourth transducing devices are withdrawn from said first, second, third and fourth unsupported tape portions and said tape loop is maintained intact.

6. A method as claimed in claim 1, wherein:

said advancing tape is rigidly guided at said first and second legs relative to said line of intersection.

7. A method as claimed in claim 1, wherein:

said advancing tape is rigidly guided relative to said line of intersection at a first location situated at said first leg and at a second location spaced from said first location;

a first variable tape loop is formed between said first and second locations;

said advancing tape is rigidly guided relative to said line of intersection at a third location situated at said second leg and at a fourth location spaced from said third location; and a second variable tape loop is formed between said third and fourth locations.

8. A method as claimed in claim 7, wherein:

said tape is derived from a first tape supply spaced from said second location and is made to extend between said first tape supply and said second location; and said tape is alternatively derived from a second tape supply spaced from said fourth location and is made to extend between said second tape supply and said fourth location.

9. In apparatus for transducing information relative to an information carrier tape, the improvement comprising in combination:

a base;

a cylindrical tape drive capstan mounted on said base for rotation about a line of intersection of two relatively stationary planes extending through said cylindrical capstan at right angles to each other;

means for placing said tape in a loop about said capstan, including means for forming at one side of one of said planes and at one side of the other of said planes a first unsupported tape portion in said loop and at the other side of said one plane and said one side of said other plane a second unsupported tape portion in said loop, said forming means including means for spacing said tape from said capstan along a curvature having a radius smaller than the radius of said capstan and having on said one plane an apex spaced from said capstan by a distance shorter than said smaller radius;

means for forming said tape into a first leg adjacent said loop at the other side of said other plane and bringing said first leg into proximity to said one side of said one plane, for forming said tape into a second leg adjacent said loop at said other side of said other plane and bringing said second leg into proximity to said other side of said one plane, and for bringing said first and second legs into proximity to each other at a distance between said first and second legs smaller than the distance between said first and second unsupported portions, whereby said tape is maintained in driving engagement with said capstan throughout a first peripheral region extending from said first unsupported portion to a portion of said loop adjacent said first leg and in driving engagement with said capstan throughout a second peripheral region extending from said second unsupported portion to a portion of said loop adjacent said second leg;

means connected to said capstan for rotating said capstan to advance said tape; and means for transducing information relative to said advancing tape between said curvature and said first peripheral region at said first unsupported tape portion and for transducing information relative to said advancing tape between said curvature and said second peripheral region at said second unsupported tape portion.

10. An apparatus as claimed in claim 9, wherein:

said first leg forming means includes a first tape guiding device;

said second leg forming means include a second tape guiding device;

said spacing means include a third tape guiding device having said curvature; and said base includes means for rigidly mounting said first, second and third guiding devices relative to said line of intersection.

11. An apparatus as claimed in claim 10, wherein:

said rigid mounting means include means for mounting said first tape guiding device at a distance from said capstan to provide in said loop a third unsupported tape portion between said first peripheral region and said first leg, and for mounting said second tape guiding device at a distance from said capstan to provide in said loop a fourth unsupported tape portion between said second peripheral region and said second leg.

12. An apparatus as claimed in claim 11, including:
means for transducing information relative to said advancing tape at said third and fourth unsupported tape portions.

13. An apparatus as claimed in claim 9, wherein:
said first leg forming means include a first tape guiding device and means for mounting said first tape guiding device at a distance from said capstan to provide in said loop a third unsupported tape portion between said first peripheral region and said first leg;
said second leg forming means include a second tape guiding device and means for mounting said second tape guiding device at a distance from said capstan to provide in said loop a fourth unsupported tape portion between said second peripheral region and said second leg;
said apparatus includes a first information transducing device, a second transducing device, means connected to said first transducing device for releasably mounting said first transducing device in a first position in transducing relationship with said tape at said third unsupported tape portion and for selectively withdrawing said first transducing device to a second position out of transducing relationship with said tape, and means connected to said second transducing device for releasably mounting said second transducing device in a third position in transducing relationship with said tape at said fourth unsupported tape portion and for selectively withdrawing said second transducing device to a fourth position out of transducing relationship with said tape;
said capstan rotating means include means for rotating said capstan at a first rate to advance said tape at a first speed when said first and second transducing devices are in said first and third positions, respectively, in transducing relationship with said tape, and for selectively rotating said capstan at a second rate higher than said first rate to advance said tape at a second speed higher than said first speed when said first and second transducing devices are withdrawn to said second and fourth positions, respectively, out of transducing relationship with said tape; and
said base includes means connected to said first and second tape guiding devices for maintaining said first and second legs spaced at smaller distance and said tape loop intact while said first and second transducing devices are withdrawn to said second and fourth positions, respectively.

14. An apparatus as claimed in claim 13, wherein:
said means for transducing information include a third transducing device and a fourth transducing device;
said first transducing device mounting means include means connected to said third transducing device for releasably mounting said third transducing device in a fifth position in transducing relationship with said tape at said first unsupported tape portion and for selectively withdrawing said third transducing device to a sixth position out of transducing relationship with said tape; and
said second transducing device mounting means include means connected to said fourth transducing device for releasably mounting said fourth transducing device in a seventh position in transducing relationship with said tape at said second unsupported tape portion and for selectively withdrawing said fourth transducing device to an eighth position out of transducing relationship with said tape.

15. An apparatus as claimed in claim 12, including:
a fourth tape guiding device;
a fifth tape guiding device;
means connected to said fourth tape guiding device and to said rigid mounting means for mounting said fourth tape guiding device at a distance from said first tape guiding device and rigidly relative to said line of intersection;
means connected to said fifth tape guiding device and to said rigid mounting means for mounting said fifth tape guiding device at a distance from said second tape guiding device and rigidly relative to said line of intersection;
means mounted movably relative to said base for forming a variable tape loop between said first and fourth tape guiding devices; and
means mounted movably relative to said base for forming a variable tape loop between said second and fifth tape guiding devices.

16. An apparatus as claimed in claim 15, including:
means for providing a first tape supply adjacent said fourth tape guiding device; and
means for providing a second tape supply adjacent said fifth tape guiding device.

17. An apparatus as claimed in claim 9, wherein:
said information transducing means include a pair of information transducing devices, means connected to said pair of transducing devices for releasably mounting one of said transducing devices in transducing relationship with said tape at said first unsupported tape portion and for releasably mounting the other of said transducing devices in transducing relationship with said tape at said second unsupported tape portion, and means for selectively withdrawing said transducing devices from transducing relationship with said tape.

18. An apparatus as claimed in claim 17, wherein:
said capstan rotating means include means for rotating said capstan at a first rate to advance said tape at a first speed when said transducing devices are in transducing relationship with said tape at said first and second unsupported tape portions, and for selectively rotating said capstan at a second rate higher than said first rate to advance said tape at a second speed higher than said first speed when said first and second transducing devices are withdrawn from transducing relationship with said tape.

19. An apparatus as claimed in claim 12, wherein:
said first tape guiding device has a tape guiding surface having a curvature and a thickness behind said tape guiding surface of less than a radius of said curvature of said tape guiding surface of said first tape guiding device;
said second tape guiding device has a tape guiding surface having a curvature and a thickness behind said curvature of said tape guiding surface of said second tape guiding device of less than a radius of said curvature of said tape guiding surface of said second tape guiding device; and
said means for transducing information relative to said advancing tape at said third and fourth unsupported tape portions include first and second transducing devices, means connected to said first transducing device for releasably mounting said first transducing device in transducing relationship with said tape at said third unsupported tape portion and partially behind said first tape guiding device as seen from said tape guiding surface of said first tape guiding device, and means connected to said second transducing device for releasably mounting said second transducing device in transducing relationship with said tape at said fourth unsupported tape portion and partially behind said second tape guiding device as seen from said tape guiding surface of said second tape guiding device.

20. In apparatus for transducing information relative to an information carrier tape, the improvement comprising in combination:

a base;

a cylindrical tape drive capstan mounted on said base for rotation about a line of intersection of two relatively stationary planes extending through said cylindrical capstan at right angles to each other;

means for placing said tape in a loop about said capstan, including means for forming at one side of one of said planes and at one side of the other of said planes a first unsupported tape portion in said loop and for forming said tape into a first leg adjacent said first unsupported tape portion and bringing said first leg into proximity to said one side of said one plane, and means for forming at the other side of said one plane and said one side of said other plane a second unsupported tape portion in said loop, and for forming said tape into a second leg adjacent said second unsupported tape portion and bringing said second leg into proximity to said other side of said one plane;

said means for forming said first unsupported tape portion and said first leg including a first tape guiding device;

said means for forming said second unsupported tape portion and said second leg including a second tape guiding device;

said first tape guiding device having a tape guiding surface having a curvature and a thickness behind said tape guiding surface of less than a radius of said curvature of said tape guiding surface of said first tape guiding device;

said second tape guiding device having a tape guiding surface having a curvature and a thickness behind said curvature of said tape guiding surface of said second tape guiding device of less than a radius of said curvature of said tape guiding surface of said second tape guiding device;

a first information transducing device;

a second information transducing device;

means connected to said first transducing device for releasably mounting said first transducing device in transducing relationship with said tape at said first unsupported tape portion and partially behind said first tape guiding device as seen from said tape guiding surface of said first tape guiding device;

means connected to said second transducing device for releasably mounting sid second transducing device in transducing relationship with said tape at said second unsupported tape portion and partially behind said second tape guiding device as seen from said tape guiding surface of said second tape guiding device; and means connected to said capstan for rotating said capstan to advance said tape.

21. An apparatus as claimed in claim 20, wherein:

said base includes means for rigidly mounting said first and second tape guiding devices relative to said line of intersection.

22. An apparatus as claimed in claim 20, wherein:

said first transducing device mounting means include means for selectively withdrawing said first transducing device to a rest position out of transducing relationship with said tape;

said second transducing device mounting means include means for selectively withdrawing said second transducing device to a rest position out of transducing relationship with said tape;

said capstan rotaing means include means for rotating said capstan at a first rate to advance said tape at a first speed when said first and second transducing devices are in transducing relationship with said tape, and for selectively rotating said capstan at a second rate higher than said first rate to advance said tape at a second speed higher than said first speed when said first and second transducing devices are withdrawn to said rest positions out of transducing relationship with said tape; and said base includes means connected to said first and second tape guiding devices for maintaining said tape loop intact while said first and second transducing devices are withdrawn to said rest positions.

23. An apparatus as claimed in claim 21, including:

a third tape guiding device;

a fourth tape guiding device;

means connected to said third tape guiding device and to said rigid mounting means for mounting said third tape guiding device at a distance from said first tape guiding device and rigidly relative to said line of intersection;

means connected to said fourth tape guiding device and to said rigid mounting means for mounting said fourth tape guiding device at a distance from said second tape guiding device and rigidly relative to said line of intersection;

means mounted movably relative to said base for forming a variable tape loop between said first and third tape guiding devices; and means mounted movably relative to said base for forming a variable tape loop between said second and fourth tape guiding devices.

24. An apparatus as claimed in claim 23, including:

means for providing a first tape supply adjacent said third tape guiding device; and means for providing a second tape supply adjacent said fourth tape guiding device.

25. In apparatus for transducing information relative to an information carrier tape, the improvement comprising in combination:

a base;

a cylindrical tape drive capstan mounted on said base for rotation about a line of intersection of two relatively stationary planes extending through said cylindrical capstan at right angles to each other;

means for placing said tape in a loop about said capstan, including means for forming at one side of one of said planes and at one side of the other of said planes a first unsupported tape portion in said loop and for forming said tape into a first leg adjacent said first unsupported tape portion and bringing said first leg into proximity to said one side of said one plane, means for forming at the other side of said one plane and said one side of said other plane a second unsupported tape portion in said loop, and for forming said tape into a second leg adjacent said second unsupported tape portion and bringing said second leg into proximity to said other side of said one plane, and means for forming at one side of said one plane and at the other side of said other plane a third unsupported tape portion in said loop and at the other side of said one plane and at the other side of the other of said planes a fourth unsupported tape portion in said loop;

said means for forming said first unsupported tape portion and said first leg including a first tape guiding device;

said means for forming said second unsupported tape portion and said second leg including a second tape guiding device;

said first tape guiding device having a tape guiding surface having a curvature and a thickness behind said tape guiding surface of less than a radius of said curvature of said tape guiding surface of said first tape guiding device;

said second tape guiding device having a tape guiding surface having a curvature and a thickness behind said curvature of said tape guiding surface of said second tape guiding device of less than a radius of said curvature of said tape guiding surface of said second tape guiding device;

said means for forming said third and fourth unsupported tape portions including means for spacing said tape from said capstan along a curvature having a radius smaller than the radius of said capstan and having an apex on said one plane;

a first information transducing device;

a second information transducing device;

means connected to said first transducing device for releasably mounting said first transducing device in transducing relationship with said tape at said first unsupported tape portion and partially behind said first tape guiding device as seen from said tape guiding surface of said first tape guiding device;

means connected to said second transducing device for releasably mounting said second transducing device in transducing relationship with said tape at said second unsupported tape portion and partially behind said second tape guiding device as seen from said tape guiding surface of said second tape guiding device;

a third information transducing device and means for mounting said third information transducing device in transducing relationship with said tape at said third unsupported tape portion;

a fourth information transducing device and means for mounting said fourth information transducing device in transducing relationship with said tape at said fourth unsupported tape portion; and means connected to said capstan for rotating said capstan to advance said tape.

26. An apparatus as claimed in claim 25, wherein:

said means for forming said third and fourth unsupported tape portions include means for spacing said apex by a distance shorter than said smaller radius.

* * * * *